United States Patent
Giacometti et al.

[11] Patent Number: 5,833,409
[45] Date of Patent: Nov. 10, 1998

[54] POWER TOOLS

[75] Inventors: Massimo Alberto Giacometti, Valmadrera; Paolo-Luca Borgonovo, Via Stoppani, both of Italy

[73] Assignee: Black & Decker Inc., Newark, Del.

[21] Appl. No.: 398,190

[22] Filed: Mar. 2, 1995

[30] Foreign Application Priority Data

Mar. 2, 1994 [GB] United Kingdom .................. 9404002

[51] Int. Cl.$^6$ ................................................. B23C 1/20
[52] U.S. Cl. .................... 409/182; 409/175; 409/205; 144/136 C
[58] Field of Search .................... 409/138, 175, 409/176, 181, 182, 205; 144/136 C, 136 D, 134 D

[56] References Cited

U.S. PATENT DOCUMENTS

| | | | |
|---|---|---|---|
| 2,997,081 | 8/1961 | Christophersen | 144/134 D |
| 3,515,029 | 6/1970 | Gambini | 409/138 |
| 3,783,915 | 1/1974 | Bryden . | |
| 3,791,260 | 2/1974 | Ambler et al. | 409/182 |
| 3,901,295 | 8/1975 | Downing | 409/205 X |
| 4,239,428 | 12/1980 | Berzina . | |
| 4,290,464 | 9/1981 | Marsan . | |
| 4,319,860 | 3/1982 | Beares | 409/182 |
| 4,562,872 | 1/1986 | Fushiya et al. . | |
| 4,566,830 | 1/1986 | Maier et al. . | |
| 5,117,879 | 6/1992 | Payne | 409/182 X |
| 5,188,492 | 2/1993 | McCracken . | |
| 5,353,852 | 10/1994 | Stolzer et al. | 409/182 X |

FOREIGN PATENT DOCUMENTS

| | | |
|---|---|---|
| 3934358 | 4/1991 | Germany . |
| 1152796 | 9/1969 | United Kingdom . |
| 2070513 | 9/1981 | United Kingdom . |
| 8100370 | 2/1981 | WIPO . |

*Primary Examiner*—M. Rachuba
*Assistant Examiner*—Henry W. H. Tsai
*Attorney, Agent, or Firm*—Dennis A. Dearing; J. Bruce Hoofnagle

[57] ABSTRACT

A power tool (e.g. a laminate trimmer 10) includes an adjustable support for setting the position of the motor unit (16). The support includes a first collar element (24) secured to the motor and a support upright (14). A stud (32) threadedly secured to the collar is slidable in a slot (28) and co-operates with the slot (28) to maintain confronting surfaces (14a and 26a) of the elements in face to face engagement. The elements are thus constrained to slide only in a direction parallel to the upright (14). A clamping screw (36) threadedly engaged in the stud can be tightened to lock the adjustable support at a desired position. The arrangement provides high stability to permit adjustment of the motor position even when the motor is operating.

14 Claims, 2 Drawing Sheets

POWER TOOLS

BACKGROUND OF THE INVENTION

This invention relates to power tools. In particular the invention relates to power tools in which a power unit, such as an electric motor, is adjustably mounted to pen-nit adjustment of the power unit's position by a user. An example of such a power tool is a laminate trimmer.

A conventional laminate trimmer comprises a base with a support for an electric motor power unit. The motor drives an abrasive bit which projects through an opening in the base. The support is adjustable to enable a user to adjust the height of the motor above the base, which in turn determines the cutting depth of the abrasive bit relative to the underside of the base. Conventionally, the support consists of a loose screw-in-slot arrangement, which can be locked or clamped in a desired position by tightening the screw.

We have appreciated that a problem arises when a user desires to adjust the position of the power unit while the power unit is in use. It will be appreciated that the power unit has to be held in position securely to dampen the vibrations which are generated within the power unit. However, with the above conventional arrangement, once the clamping, screw has been loosened, the power unit is no longer adequately supported for stability, and is free to tilt out of alignment from its normal "clamped" operating axis. This leads to a difficulty in setting accurately the desired cutting depth of the abrasive bit while in use; such a capability would be a particularly advantageous feature for a trimmer.

SUMMARY OF THE INVENTION

The present invention has been devised with the above problems in mind.

In a first aspect, the invention provides a power tool comprising a power unit and an adjustable support for supporting the power unit relative to another part of the power tool, wherein the adjustable support comprises guide means for constraining movement of the power unit to movement in a specific alignment direction relative to said other part of the power tool, and means operable to selectively lock the power unit at a desired position.

With such an arrangement, the power unit is not only adjustable, but it is stabilised against tilting out of alignment while adjustment is being carried out.

Preferably, the guide means comprises first and second elements or means relatively slidable substantially only in the alignment direction. The first and second means may comprise co-operating surfaces to obstruct relative movement in directions other than the alignment direction.

The first and second means may include respective generally curved confronting surfaces which are relatively slidable in the alignment direction. The guide means may further comprise retaining means for retaining the first and second means with their confronting surfaces substantially in face-to-face relation. Such retaining means may comprise a projection from the first means, the projection being received in a guide slot or channel of the second means, the projections and slot including co-operating surfaces to retain the first and second means in close relation. The slot may extend in a direction parallel to the alignment direction to permit slidable movement. The projection may comprise a fixing such as a screw or stud, secured to the first means.

Preferably, the locking means comprise means for clamping the first and second means to prevent relative movement. Such clamping means may comprise a clamping screw.

The invention is particularly suitable for implementation as a laminate trimmer, but it may find useful application in other forms of power tool.

In a closely related second aspect, the invention relates to a specific form of adjustable support adapted for use in a power tool to support a power unit relative to another part of a said power tool. The adjustable support comprises a first element attached to or for attachment to a said power unit, and a second element attached to or for attachment to said other part of said power tool, the first and second elements comprising respective generally curved confronting surfaces which are relatively slidable in a predetermined alignment direction, retaining means for retaining the first and second elements with the confronting surfaces substantially in face-to-face relation to constrain relative slidable movement in the alignment direction, and locking means operable to selectively clamp the first and second elements together to lock the adjustable support at a desired position.

BRIEF DESCRIPTION OF THE DRAWINGS

An embodiment of the invention is now described by way of example, with reference to the accompanying drawings, in which.

DETAILED DESCRIPTION OF THE PREFERRED EMBODIMENT

Figure 1:
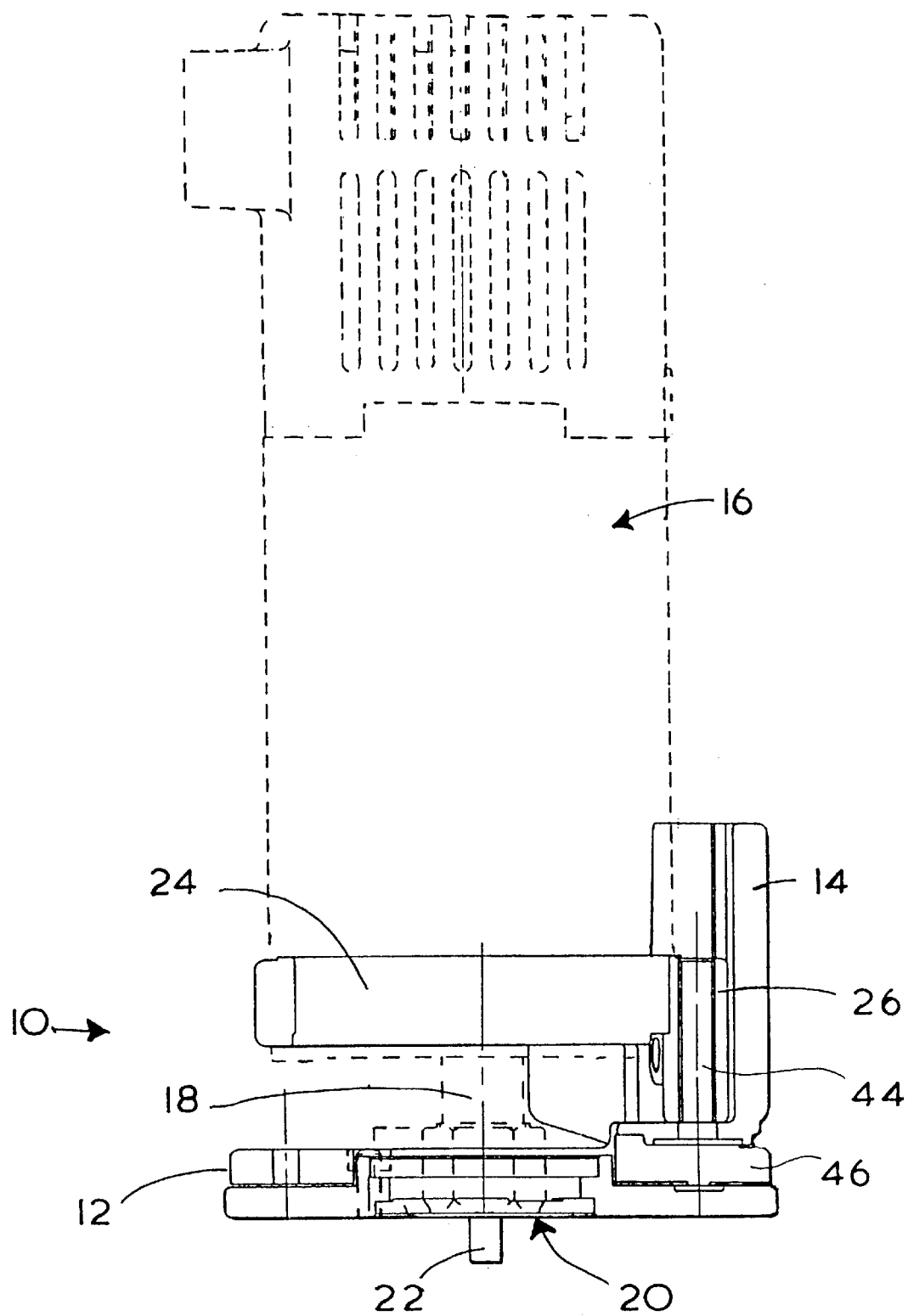
FIG. 1 is a schematic side view of a laminate trimmer power tool.
Figure 2:
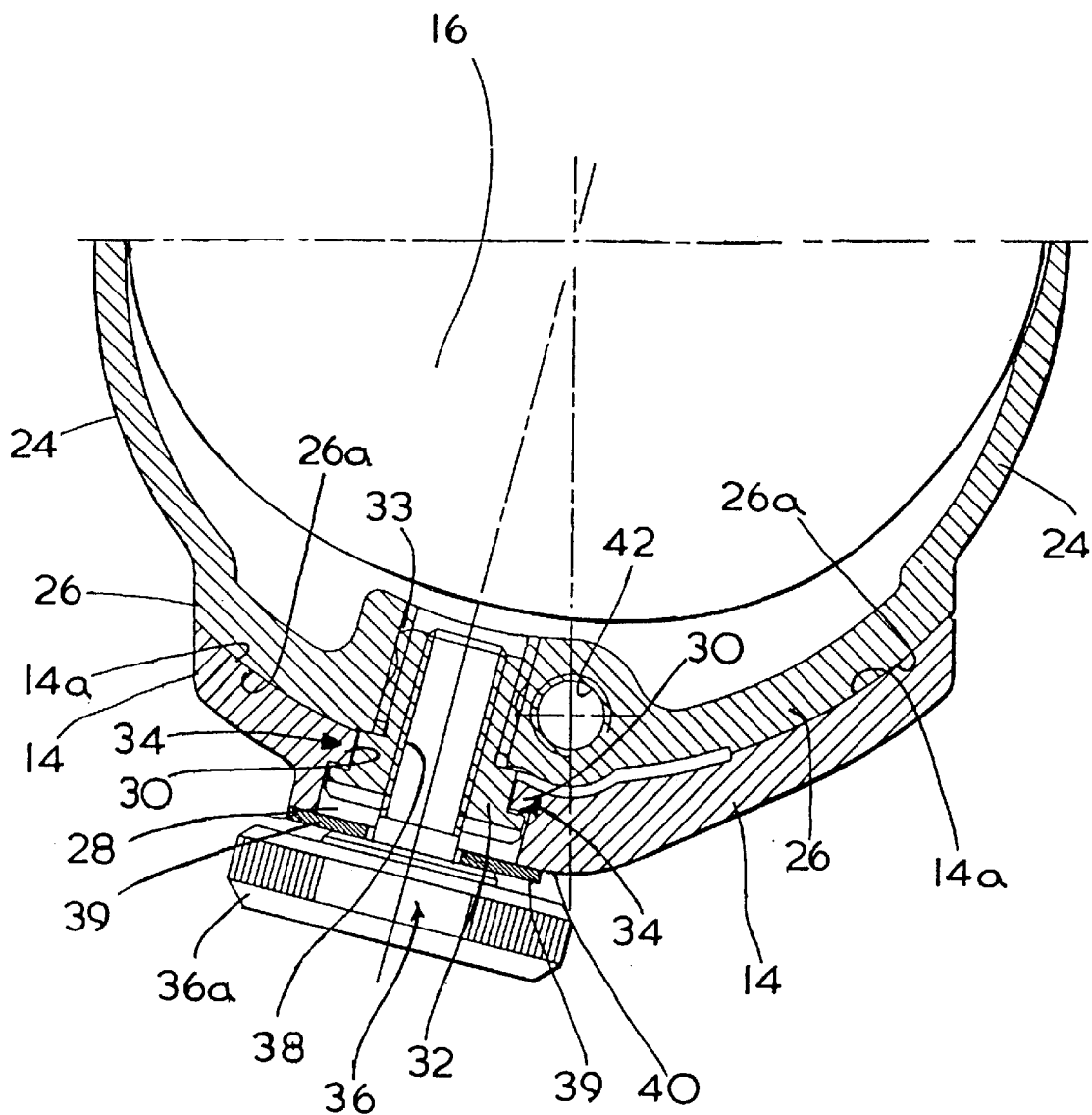
FIG. 2 is a horizontal partial section through the adjustable motor support of the trimmer.

Referring to the drawings, a laminate trimmer 10 comprises a base or casting 12 which includes a support upright 14 for supporting an electric motor power unit 16, as described in more detail below. A drive spindle 18 projects from the power unit 16 through an opening 20 in the base 12, and an abrasive cutting bit 22 is removably carried at the projecting end of the drive spindle 18. (In FIG. 1, the motor unit 16 and the spindle 18 are shown in phantom for ease of identification). The support upright 14 is adjustable to enable a user to adjust the height of the motor unit 16 above the base 12, and thereby control the cutting or trimming depth of the abrasive bit 22.

The motor unit 16 is generally cylindrically shaped. The lower end of the motor unit 16 is received securely in a mounting collar 24 which includes a radially arcuate portion 26 which also depends from the collar. The support upright 14 is generally arcuately shaped to match the arcuate shape of the portion 26 of the collar 24, and the upright 14 and the collar portion 26 have generally confronting surface portions 14a, 26a, respectively. An upright slot 28 is formed in the upright 14. The sides of the slot 28 have a step profile to define a pair of opposing lips 30 in the region adjacent to the portion 26. A hollow threaded stud 32 is screwed tightly into a threaded opening 33 in the collar 24. The stud 32 projects through the slot 28, and has a head with a complementary shape to the stepped sides of the slot. The stud 32 and the adjacent surface of the collar portion 26 together define channel regions 34 in which the lips 30 of the slot are received. The stud 32 and the slot 28 together co-operate to retain confronting surfaces 14a and 26a of the support upright 14 and the collar portion 26, respectively, substantially in face-to-face relation. The arrangement thus defines a slidable connection in which the collar 24 is slidable relative to the upright 14, but is constrained to move only in a direction substantially parallel to the longitudinal direction of the upright 14.

A thumb screw 36 is threadedly received within the central core 38 of the hollow stud 32. A washer 39 mounted on the stem of the screw 36 is sandwiched between the head 36a of the thumb screw 36 and the outer surface 40 of the upright 14.

In use, tightening of the thumb screw 36 causes pressure to be applied between the washer 39 and the stud 32 secured in the collar 24 to draw the confronting surfaces 26a and 14a of the collar portion 26 and the upright 14, respectively, into tight surface to surface engagement. This acts as a clamping arrangement to lock the collar 24, and hence the power unit 16, at its current position relative to the upright 14.

When it is desired to adjust the position of the power unit 16, the user loosens the thumb screw 36, thereby to relax the clamping effect between the collar portion 26 and the upright 14. The collar 24 carrying the power unit 16 is then free to be slid in a direction substantially parallel to the upright 14, in order to set the cutting depth of the abrasive bit 22. As described above, the confronting surfaces 14a and 26a retained in close engagement by the co-operating stud 32 and slot 28 limit the available movement of the power unit so that it is prevented from tilting out of its normal alignment direction relative to the base 12 and the support upright 14. Even when the power unit 16 is in use and is subject to vibration, the support upright 14 is sufficiently stable to permit fine adjustment of the position of the power unit, and hence allow accurate setting of the cutting or trimming depth.

The collar 24 also includes a threaded bore 42 aligned substantially parallel with the adjustment direction of the power unit 16, ie. substantially parallel with the upright 14. The bore 42 receives a threaded shaft 44 which is rotatably mounted at the base 12 by a thumb screw 46, and by which the collar 24 is raised and lowered relative to the base in order to adjust the height of the power unit 16.

Although a straight laminate trimmer has been described in the preferred embodiment, it will be appreciated that in other embodiments the trimmer may be an offset base trimmer.

It will further be appreciated that the invention may be used with power tools other than laminate trimmers, but in which it is desired to provide a user-adjustable support for a power unit. It is emphasised that the foregoing description is merely illustrative of a preferred form of the invention, and that modifications may be made without departing from the scope and principles of the invention.

We claim:

1. A power tool comprising a power unit and an adjustable support for supporting the power unit relative to the power tool, wherein the adjustable support comprises:
   mounting means for mounting to the power unit;
   a base spaced from the mounting means and formed with an opening for passage of a work element which may be extending from the power unit;
   a support member mounted on the base and extending therefrom;
   retaining means for retaining a portion of the mounting means for movement through a plurality of locations adjacent a portion of the support member and for allowing selective relative movement therebetween while maintaining the adjacency of the mounting means and the supporting member so that the power unit can be selectively located relative to the base;
   the mounting means and the support member forming a guide means for limiting movement of the mounting means to the plurality of positions adjacent the support member while the retaining means maintains the adjacency of the mounting means and the support member; and
   locking means for selectively securing the mounting means at a desired position.

2. A tool according to claim 1, wherein the mounting means and the support member are relatively slidable substantially only in said alignment direction.

3. A tool according to claim 2, wherein the mounting means and the support member comprise co-operating surfaces to obstruct relative movement in directions other than said alignment direction.

4. A tool according to claim 3, wherein the mounting means and the support member comprise respective generally curved confronting surfaces which are relatively slidable in said alignment direction, the retaining means for retaining further the mounting means and the support member with the confronting surfaces substantially in face-to-face relation.

5. A tool according to claim 4, wherein the retaining means comprises a projection from the mounting means, the projection being received in a guide slot or channel of the supporting member, the guide slot extending parallel to the alignment direction to permit slidable movement, the projection and the slot including co-operating surfaces to retain the mounting means and the support member in close relation.

6. A tool according to claim 5, wherein the projection comprises a stud secured to the mounting means.

7. A tool according to claim 6, wherein the projection is threadedly coupled to the mounting means.

8. A tool according to claim 2, wherein the mounting means comprises a collar attached securely to the power unit.

9. A tool according to claim 2 wherein the locking means comprises means for clamping the mounting means and the support member to prevent relative movement.

10. A tool according to claim 9, wherein the clamping means is associated with the projection of the mounting means, the clamping means acting through the projection to clamp the confronting surfaces of the mounting means and the support member.

11. A tool according to claim 10, wherein the clamping means threadedly engages the projection.

12. A tool according to claim 1, wherein the tool is a laminate trimmer.

13. An adjustable support adapted for use in a power tool to support a power unit relative to a base of said power tool, the adjustable support comprising a mounting means attached to or for attachment to said power unit, and a support member attached to or for attachment to said base of said power tool, the mounting means and the support member comprising respective generally curved confronting surfaces which are relatively slidable in a direction substantially parallel to the support member, retaining means for retaining the mounting means and the support member with the confronting surfaces substantially in face-to-face relation to allow relative slidable face-to-face movement in the alignment direction and to preclude movement in all other directions, and locking means operable to selectively clamp the mounting means and the support member together to lock the adjustable support at a desired position.

14. An adjustable support according to claim 13, wherein the retaining means comprises a projection from one of the mounting means and the support member received in a slot of the other of the mounting means and the support member, and the locking means is threadedly engaged within the projection.

* * * * *